United States Patent
Atkinson

(10) Patent No.: US 6,598,473 B2
(45) Date of Patent: Jul. 29, 2003

(54) QUANTITY GAUGING

(75) Inventor: Harry Atkinson, Wokingham (GB)

(73) Assignee: Smiths Group PLC, London (GB)

( * ) Notice: Subject to any disclaimer, the term of this patent is extended or adjusted under 35 U.S.C. 154(b) by 0 days.

(21) Appl. No.: 09/767,824

(22) Filed: Jan. 24, 2001

(65) Prior Publication Data

US 2001/0010171 A1 Aug. 2, 2001

(30) Foreign Application Priority Data

Jan. 27, 2000 (GB) ............................................. 0001746

(51) Int. Cl.⁷ ............................................. G01F 23/00
(52) U.S. Cl. ...................... 73/290; 73/290 R; 73/304 C
(58) Field of Search ........................ 73/290 R, 304 R, 73/304 C, 290 V, 64.55

(56) References Cited

U.S. PATENT DOCUMENTS

| | | | | |
|---|---|---|---|---|
| 4,417,473 A | * | 11/1983 | Tward et al. ............. | 73/304 C |
| 4,780,663 A | * | 10/1988 | Mulder .................... | 324/65 P |
| 4,815,323 A | * | 3/1989 | Ellinger et al. ........... | 73/290 V |
| 5,315,563 A | * | 5/1994 | Lichtenfels, II et al. ...... | 367/99 |
| 5,379,658 A | * | 1/1995 | Lichtenfels, II et al. ... | 73/866.5 |
| 5,793,705 A | * | 8/1998 | Gazis et al. .................. | 367/98 |
| 5,996,407 A | * | 12/1999 | Hewitt ..................... | 73/290 V |

FOREIGN PATENT DOCUMENTS

| | | |
|---|---|---|
| EP | 0 697 583 A1 | 2/1996 |
| GB | 2 265 219 A | 9/1993 |
| GB | 2 270 160 A | 3/1994 |
| GB | 2 311 373 A | 9/1997 |

* cited by examiner

*Primary Examiner*—Hezron Williams
*Assistant Examiner*—Rodney Frank
(74) *Attorney, Agent, or Firm*—Connolly Bove Lodge & Hutz LLP

(57) ABSTRACT

An aircraft fuel quantity gauging system has a number of probes within a tank to measure the height of fuel at different locations. Each probe includes a still well and an ultrasonic transducer mounted at the top and bottom of the still well. The lower transducer transmits pulses of acoustic energy upwardly through the fuel to its surface and measures the time of travel back of the reflected pulse back to the transducer. This is used to derive a first, bottom-up measure of fuel height. Similarly, the upper transducer transmits pulses down through air to the fuel surface to derive a second, top-down measurement. These are compared to check for correct operation of the probes.

7 Claims, 2 Drawing Sheets

QUANTITY GAUGING

BACKGROUND OF THE INVENTION

This invention relates to quantity gauging.

The invention relates to systems and methods of quantity gauging and, more particularly, but not exclusively, to fuel-gauging systems and methods.

Conventional fuel-gauging systems may employ a capacitive sensor consisting of a tubular outer electrode and a concentric inner electrode. The sensor is mounted on the floor of the fuel tank projecting upwardly, the outer electrode being filled with fuel to the same level as in the tank. The capacitance between the two electrodes changes as fuel level changes and, by measuring the capacitance, an indication of fuel height can be obtained. Alternatively, the system may employ an ultrasonic sensor in which an ultrasonic transducer is mounted on the floor of the tank. The transducer transmits ultrasonic pulses upwardly through the fuel to its interface with gas above the fuel where the pulses are reflected. By measuring the time taken between transmitting a pulse and receiving its reflection, the height of fuel can be calculated. This is sometimes referred to as a "bottom-up" technique. Usually, ultrasonic gauges of this kind employ a still well, that is, a tube in which the acoustic pulses are confined. Ultrasonic gauges are also used in a "top-down" technique where the transducer is mounted above the level of the substance being measured and the pulses are transmitted down through air to the surface of the substance, where they are reflected back to the transducer. Examples of ultrasonic gauging systems are described in GB2311373, GB2290141, GB2270160, GB2265005, GB2265219 and GB2340603.

There are various difficulties associated with ultrasonic or acoustic level measurement. Measurements may become inaccurate when the surface of the liquid is disturbed in some way, such as by the presence of foam, waves or by being at an angle. It is important to be able to determine whether or not a measurement of height from a sensor is accurate and whether the sensor is functioning correctly.

BRIEF SUMMARY OF THE INVENTION

It is an object of the present invention to provide an alternative quantity gauging system, probe and method.

According to one aspect of the present invention there is provided a quantity-gauging system including first means for determining the distance below a first location of an interface between two different fluids and second means for determining the distance of the interface above a second location, the outputs of the first and second means being supplied to means for determining an indication of quantity of one of the fluids.

One or both of the first and second means preferably include acoustic means for generating pulses of acoustic energy towards the interface. The system may include a still well having the first and second means mounted at opposite ends of the still well. The second means may include capacitive electrodes. Alternatively, the second means may include acoustic means for generating a pulse of acoustic energy up towards the interface, the first means including capacitive electrodes. One of the first and second means may include a pair of concentric tubular capacitive electrodes, the other of the first and second means including acoustic means arranged to direct a pulse of acoustic energy along the centre of the inner electrode. The first and second means may include acoustic means for generating pulses of acoustic energy towards the interface from opposite sides, the system additionally including capacitive electrodes for providing an additional indication of the position of the interface. The capacitive electrodes are preferably a pair of concentric tubular electrodes, the acoustic means being arranged to direct pulses of acoustic energy along the centre of the inner electrode. One fluid is preferably a liquid and the other fluid is a gas above the liquid.

According to a second aspect of the present invention there is provided a quantity-gauging system including means located in a fluid for providing an indication of the height of the fluid above a lower location, means located above the fluid for providing an indication of the distance of the fluid surface below an upper location and means for comparing the outputs of the first and second means to determine if the system is performing accurately.

The system may include a plurality of probes, each probe including first and second means.

According to a third aspect of the present invention there is provided a quantity-gauging probe including first and second means for providing separate indications of the height of fluid along the probe.

According to a fourth aspect of the present invention there is provided a method of determining an indication of the quantity of a fluid including the steps of determining the height of an interface of the fluid above a first location below the interface, determining the distance of the interface below a second location above the interface, and determining the quantity of fluid accordingly.

An aircraft fuel-gauging system and method according to the present invention will now be described, by way of example, with reference to the accompanying drawings.

DETAILED DESCRIPTION OF THE PREFERRED EMBODIMENTS

Figure 1:
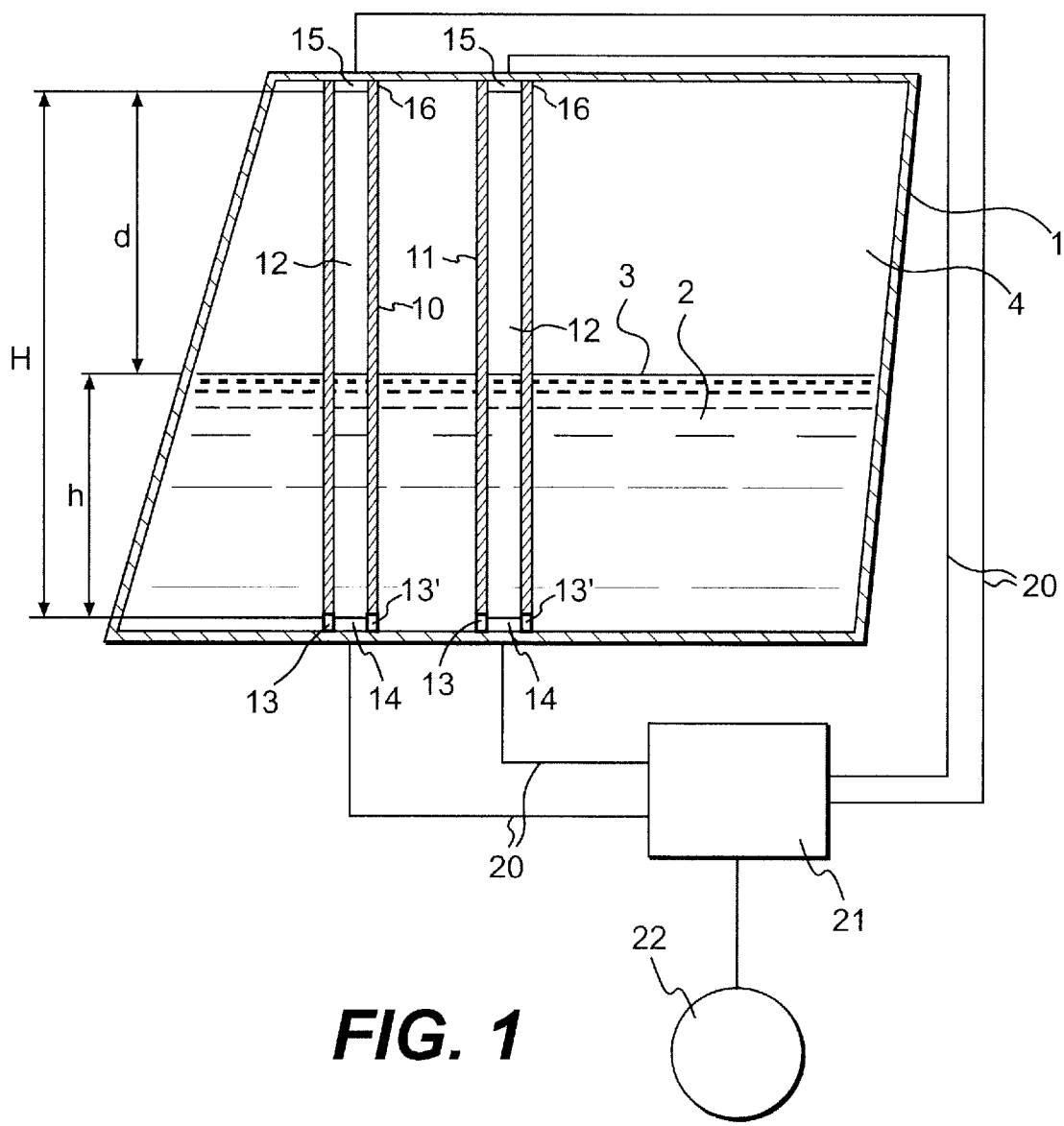
FIG. 1 shows the system schematically.

With reference first to FIG. 1, the system has a tank 1, typically of irregular shape, containing fuel 2. The upper surface 3 of the fuel forms an interface with a volume of air 4 or other gas above the fuel. The tank 1 contains two identical fuel-gauging probes 10 and 11, although any number of probes could be used as necessary according to the shape of the tank.

The probes 10 and 11 could be of various different kinds capable of measuring the position of the fuel surface from both below and above the fuel surface. In the present example, each probe has a still well 12 in the form of a tube with openings 13' at its lower end 13 so that it is filled with fuel to the same height as outside the probe. Each probe 10 and 11 also includes two ultrasonic acoustic sensors, one transducer 14 being located at the lower end 13 of the probes and the other transducer 15 being located at the upper end 16 of the probe. The lower transducer 14 is submerged in fuel 2, except when tank 1 is empty, and directs pulses of acoustic energy upwardly through the fuel along the inside of the still well 12. The pulses are reflected back down by the fuel surface 3 because of different acoustic propagation properties of the fuel 2 and the gas 4. This transducer 14, therefore, gives a "bottom-up" measurement. The upper transducer 15 is exposed above the fuel surface 3, except when the tank 1 is full, and directs pulses of acoustic energy downwardly through the gas 4 along the inside of the still well 12. The pulses are reflected back up by the fuel surface 3. The upper transducer 15, therefore, gives a "top-down" measurement. It will be appreciated that the pulses from the two transducers 14 and 15 will typically be transmitted at different times or have different frequencies to enable discrimination between signals that might be transmitted across the interface.

The transducers 14 and 15 of each probe 10 and 11 are connected by cables 20 to a drive and processing unit 21. The processing unit 21 determines the height h of fuel 2 above the location of the lower transducer 14 and the distance d of the fuel surface 3 below the location of the upper transducer 15. The distance H between the locations of the two transducers 14 and 15 is known, so the processor can perform the following comparison:

$$H-t_1<d+h<H+t_2$$

where $t_1$ and $t_2$ are the appropriate tolerances.

If the comparison shows that the probes 10 and 11 are both performing correctly, within tolerances, the processing unit 21 uses the indication h of the height of fuel 2 from the submerged transducers 14 at each probe 10 and 11 to determine the position of the fuel surface 3. From the position of the fuel surface 3 and the known shape of the tank 1, the processing unit 21 computes the volume of fuel in a conventional manner. This volume is usually converted to an indication of mass and this is provided as a quantity indication to a display or other utilisation means 22.

The output of the submerged transducers 14 normally provides a better indication of fuel height than that of the exposed transducers 15 because acoustic energy is transmitted through liquid with less attenuation than through gas. In some applications, however, it might be preferable to utilize the output of the exposed transducer in the actual computation of quantity rather than simply as corroboration of the output of submerged transducer. The output of the exposed transducer might be used instead of the submerged transducer or an average or weighted average of the two outputs might be used.

If the processing unit 21 indicates that the outputs of the two transducers are not within accepted tolerances, it indicates a fault and may calculate fuel quantity using only any remaining correctly operating probes. If the processing unit 21 determines that the output of the exposed transducer 15 is providing an output that is more likely to be correct (such as by comparison with adjacent probes or with previous outputs from the probe) it may be arranged to utilize the output of the exposed transducer 15 instead of that of the submerged transducer 14.

There are many ways in which the system could be modified. For example, the upper and lower transducers need not be mounted in the same probe but could be in different probes adjacent one another. Other sensors employing techniques apart from acoustic techniques could be used to determine one or both of the top-down or bottom-up measurements.

Figure 2:
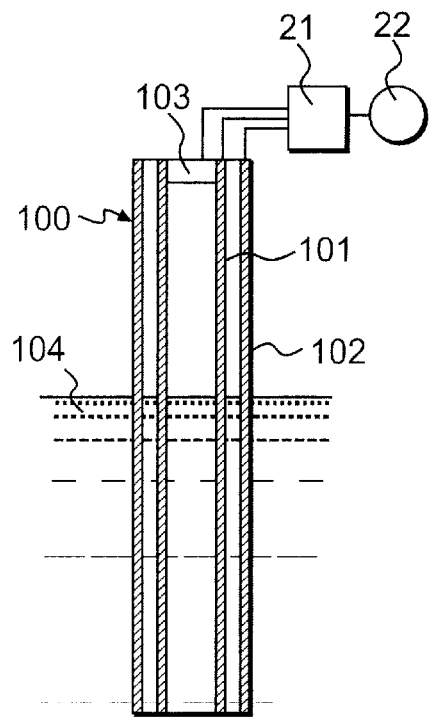
FIGS. 2 to 4 are simplified sectional views of alternative probes.

With reference to FIG. 2, there is shown an alternative probe 100 including a sensor in the form of two concentric tubular capacitive electrodes 101 and 102 and an ultrasonic transducer 103 mounted at the upper end of the inner electrode to direct acoustic pulses along the centre of the electrode. As the level of fuel 104 changes, the capacitance between the inner and outer electrodes 101 and 102 changes providing a first output indication of fuel height. The ultrasonic transducer 103 directs pulses down along the inside of the inner electrode 101 and provides a second, separate indication of fuel height.

Figure 3:
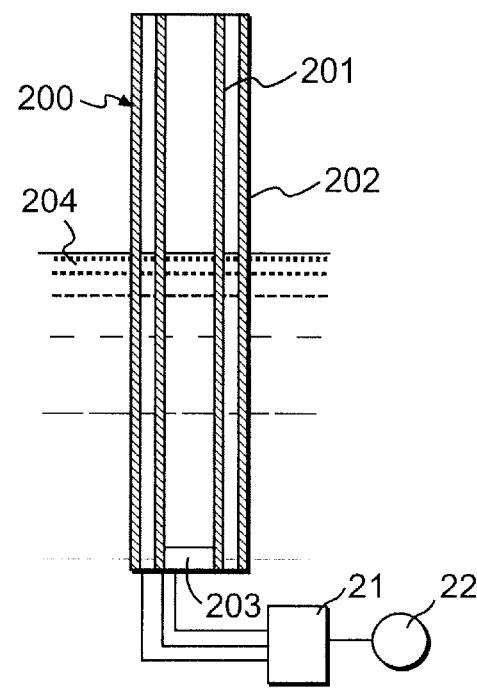

FIG. 3 shows a probe 200 similar to that of FIG. 2 except that the ultrasonic transducer 203 is mounted at the bottom of the probe so that it is submerged in fuel 204 and directs pulses upwardly within the inner electrode 201. Again, this probe provides two separate indications of fuel height, one derived capacitively and the other derived acoustically.

Figure 4:
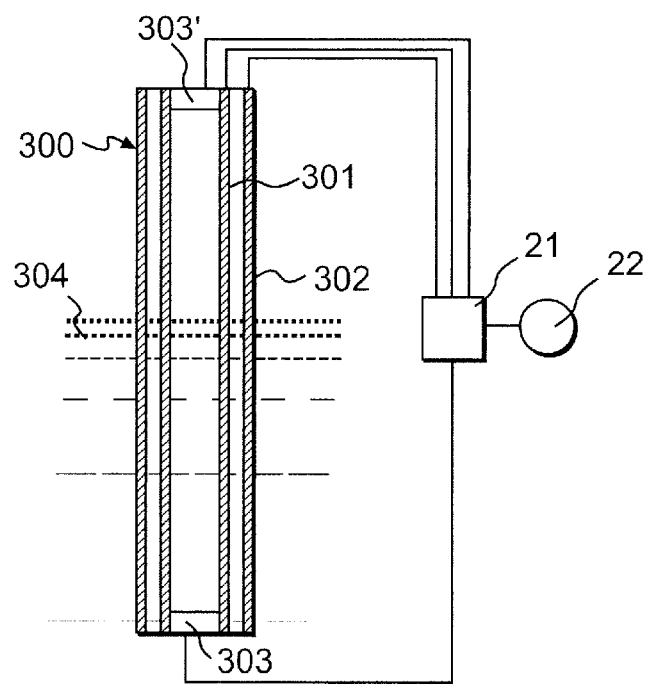

The probe 300 shown in FIG. 4 has an inner and outer electrode 301 and 302 and two ultrasonic transducers 303 and 303' mounted at the top and bottom of the inner electrode. This probe 300 can provide three separate indications of fuel height for additional integrity, namely a capacitive indication, a bottom-up acoustic indication and a top-down acoustic indication.

Although an acoustic technique is preferred for measuring the top-down position of the fluid, other techniques, such as optical techniques, could be used.

It will be appreciated that the present invention is not confined to measuring the quantity of fuel but could be used to measure the quantity of any other fluid, including powders, granular materials, pastes or other flowable material. It could be used to measure the quantities of two different liquids of different densities in a tank.

What I claim is:

1. A quantity-gauging system comprising:
   a still well; a first acoustic transducer mounted towards one end of said still well and arranged to determine a height of an interface between two different fluids; capacitive electrodes disposed within said still well and arranged to provide an indication of a position of said interface; and a processing unit connected to receive outputs of said first acoustic transducer and said capacitive electrodes to provide an indication of quantity of one of said fluids derived from the outputs of both said first acoustic transducer and said capacitive electrodes.

2. A system according to claim 1, wherein said capacitive electrodes have an inner and outer electrode arranged concentrically of one another, and wherein said first acoustic transducer is arranged to direct pulses of acoustic energy along the center of the inner electrode.

3. A system according to claim 1, wherein one fluid is a liquid and the other fluid is a gas above the liquid.

4. A system according to claim 1 including a plurality of still wells, wherein each of said still wells includes a first acoustic transducer and capacitive electrodes.

5. A system according to claim 1, wherein the first acoustic transducer is mounted at a lower end of the still well.

6. A system according to claim 1, wherein the first acoustic transducer is mounted at an upper end of the still well.

7. A system according to claim 1, including a second acoustic transducer arranged to determine the height of the interface, wherein the first and second acoustic transducers are mounted at opposite ends of the still well.

* * * * *